United States Patent [19]
Gunther

[11] 3,928,070
[45] Dec. 23, 1975

[54] ELECTROLYTE FOR ORGANIC ELECTROLYTE CELLS
[75] Inventor: Ronald G. Gunther, Mystic, Conn.
[73] Assignee: Yardney Electric Corporation, Pawcatuck, Conn.
[22] Filed: Mar. 28, 1974
[21] Appl. No.: 455,580

[52] U.S. Cl............................. 136/83 R; 136/154
[51] Int. Cl.²........................................... H01M 6/04
[58] Field of Search........... 136/6 LN, 20, 154, 155, 136/107, 83 R; 252/62.2

[56] References Cited
UNITED STATES PATENTS

| | | | |
|---|---|---|---|
| 2,857,295 | 10/1958 | Brown | 136/154 |
| 2,960,558 | 11/1960 | Marsal et al. | 136/154 |
| 3,057,944 | 10/1962 | Ruetschi et al. | 136/154 |
| 3,536,532 | 10/1970 | Watanabe et al. | 136/107 |
| 3,624,459 | 11/1971 | Brown et al. | 252/62.2 |
| 3,716,410 | 2/1973 | Butler et al. | 136/154 |

*Primary Examiner*—Donald L. Walton
*Attorney, Agent, or Firm*—Jay H. Quartz; Donald E. Nist

[57] ABSTRACT

Improved performance of organic electrolyte cells is obtained by dissolving a non-ionic surfactant in the organic electrolyte with the non-ionic surfactant comprising at least 0.01 percent by weight and, preferably, about 0.01 to about 2 percent by weight of the weight of organic electrolyte.

15 Claims, 3 Drawing Figures

ELECTROLYTE FOR ORGANIC ELECTROLYTE CELLS

BACKGROUND OF THE INVENTION

This invention relates to organic electrolyte cells and, more specifically, to the organic electrolytes employed in such cells.

Particularly in the recent past, organic electrolyte cells have attracted great interest because of the very high energy densities obtainable from these cells. That is, high energy densities are obtainable because of the use of lightweight metals, such as lithium and sodium, which have large negative standard potentials on a scale in accord with the Stockholm Convention. Cells which utilize these metals for the anode ordinarily have non-aqueous electrolytes, i.e., organic electrolytes, because the use of aqueous electrolytes produces undesirable chemical reactions between the anode metal and the water component of the electrolyte with the liberation of hydrogen and, in the case of a metal such as magnesium, in the formation of a partially passivating film on the surface of the magnesium.

A large class of electrolytes which is compatible with the aforementioned highly reactive metals includes organic solvents such as cyclic and linear esters, ethers and nitriles. While use of these solvents for electrolytes has made possible the use of highly reactive metals in electrochemical power sources, these organic electrolytes place certain limitations on the performance of the cells. In order to improve the performance of cells utilizing these organic electrolytes and highly reactive metals, the solvents have usually been modified by combining various solvents in an attempt to optimize organic electrolyte characteristics. A particular example is the addition of tetrahydrofuran (b.p. 65°C.) to propylene carbonate. However, this modification, even though it produces improved cell performance in some cases, has the disadvantage that the vapor pressure of the combined solvent is very high at elevated temperatures due to the presence of the low boiling component. Since organic electrolyte cells are ordinarily hermetically sealed, the resulting high pressures of such an electrolyte system dictate the use of thick-walled cases with a resultant decrease in the real energy density of the system.

SUMMARY OF THE INVENTION

This invention comprises the addition of a non-ionic surfactant to cells which employ organic electrolytes. The surfactant employed is one which is soluble in the organic electrolyte which is employed in a particular organic electrolyte cell. It is added in an amount of at least about 0.01 percent by weight of the organic electrolyte. In general, the other components of organic electrolyte cells with which the surfactant can be employed are those which are well known by those skilled in the art as being suitable for use in organic electrolyte cells of the prior art.

Use of the herein-described surfactants results in a substantial improvement in the performance of organic electrolyte power cells without the attendant disadvantages of the prior art, such as the problems associated with the use of low-boiling organic solvents. Improved cell performance includes improved discharge performance and increased weight energy density (watt-hours/lb.). Improvements in volume energy density may also be realized depending upon whether expansion of the carbonaceous cathode materials during cell operation completely negates the improvement in volume energy density which is theoretically possible in the absence of such expansion. Additionally, the addition of the surfactant to the electrolyte is quite flexible in that it can be added directly to the electrolyte or it can be added indirectly, such as by including it in the cathode from which it can be dissolved by the organic electrolyte. Furthermore, substantial improvements are realized from the use of rather small amounts of the non-ionic surfactants.

DESCRIPTION OF THE PREFERRED EMBODIMENT

Figure 1:
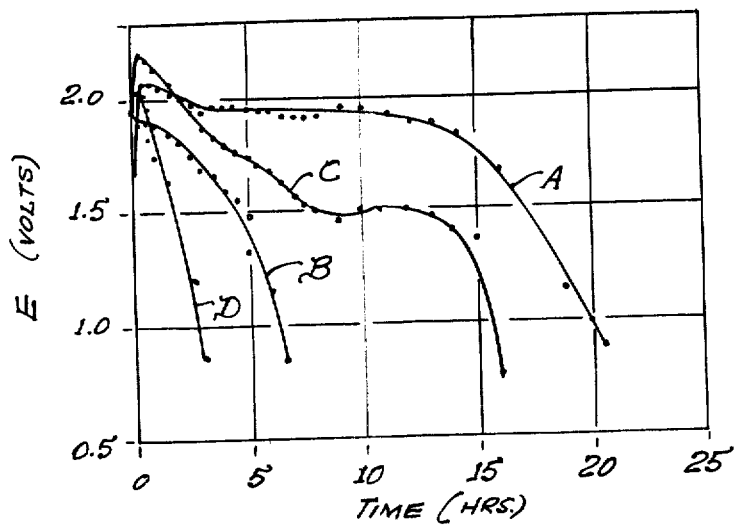
FIG. 1 is a plot of cell voltage vs. time while the cell is being discharged and graphically illustrates the effect of introducing a non-ionic surfactant into the electrolyte of organic electrolyte cells.

In brief, a non-ionic surfactant is added either directly or indirectly to the organic electrolyte in an organic electrolyte cell to obtain greater performance from the cell than is possible without the surfactant.

The surfactants (or wetting agents as they are sometimes called) which can be employed are those organic compounds of the class of non-ionic surfactants which are soluble in the organic solvent employed as the electrolyte. As is well known, many non-ionic surfactants, such as the Triton surfactants, are available in a wide range of molecular weights; however, regardless of their molecular weight, they can be employed provided they meet the aforementioned solubility requirement. The surfactant must also be substantially water-free since the inclusion or presence of water in the surfactant can have a deleterious effect on the operation of a cell because of the reaction of water with the particular anodic materials employed in the cells with which the surfactant is used. If a particular non-ionic surfactant includes some water as a result of, for example, its manufacture from an aqueous medium, the water may be removed by vacuum distillation.

Examples of useful non-ionic surfactants include: alkyl aryl polyethers such as nonyl phenoxy polyoxyethylene; alkyl aryl polyethylene glycol ethers such as nonyl phenyl polyethylene glycol ether and dodecylphenyl polyethylene glycol ether; and alkyl aryl polyether alcohols such as iso-octyl phenoxy polyethoxy ethanol and nonylphenoxy polyethoxy ethanol. Mixtures of these and other non-ionic surfactants may also be employed.

The surfactant is employed in an amount of at least about 0.01 percent by weight of the weight of organic electrolyte. Below about 0.01 percent, there is insufficient surfactant present in the electrolyte to produce an appreciable change in the performance characteristics of an organic electrolyte cell. The practical upper limit on the amount of non-ionic surfactant is about 10 percent by weight of the weight of organic electrolyte. Above about 10 percent, large increments in the amount of surfactant are accompanied only by small improvements in performance. Additionally, the use of very large amounts of surfactant can make the electrolyte too viscous, thus nullifying some of the advantages obtained by adding the surfactant. Preferably, about 0.01 to about 2 percent by weight of surfactant is employed. In this preferred range, the amounts of added surfactant are accompanied by substantial improvement in the performance characteristics of organic electrolyte cells.

While the mechanism by which the surfactant acts to provide improved cell performance, i.e., increased discharge voltage and active material utilization, is not presently fully understood, it is believed that the surfactant increases the electrolyte permeation of the cathode structure. This belief is supported by Example 4 wherein it is shown that the performance of a cell which included an amount of surfactant was similar to the performance of a like cell without surfactant even though the latter cell included a cathode having a 20 percent lower active material density than the former cell. Additionally, it has been observed that, although some improvement in cell performance is obtainable when the cell includes a low viscosity electrolyte such as tetrahydrofuran and 1,2-dimethoxyethane, the effectiveness of the herein-described surfactants is primarily realized with electrolytes of higher viscosity such as are described in the Examples.

As has been stated hereinbefore, the described surfactants are employed in conjunction with organic electrolyte cells. Such cells are described, for example, in Jasinski, *High Energy Batteries*, p. 125 et seq. (1967). These cells comprise components which will now be briefly described.

The anode can be made from any metal which is less noble than zinc. For example, sodium lithium, potassium, magnesium, aluminum and calcium may be employed.

The cathode can be made from carbonaceous materials such as the fluorocarbons which are described in U.S. Pat. No. 3,536,532, issued Oct. 27, 1970, and in co-pending patent application Ser. No. 379,257, filed July 16, 1973, and entitled "Improved Cathode material for Use in Non-Aqueous Electrolytes," the disclosures of which are incorporated herein by reference. Briefly, such materials have the general formula $(CF_x)_n$ where $x$ is a positive number up to 2 and where $n$ is an indefinite large number. Additionally, the cathode can be made from other well-known cathodic materials such as copper chloride or fluoride, silver chloride, manganese dioxide, molybdenum trioxide, silver chromate, and sulfur dioxide.

The electrolyte solvent is any organic solvent which is known for use in organic electrolyte cells and includes propylene carbonate, $\gamma$-butyrolactone, acetonitrile, dimethyl formamide, tetrahydrofuran, nitromethane, diethyl ether, and 1,2-dimethoxy ethane. Various mixtures of these organic solvents may also be suitably employed.

The solute present in the electrolyte is also known and includes lithium perchlorate, lithium chloride, aluminum chloride, lithium hexafluorophosphate, lithium hexafluoroarsenate, and lithium bromide. Similar salts of anodic materials other than lithium can also be used. Additionally, various combinations of solutes can be used.

In preparing an organic electrolyte cell for operation when using the herein-described surfactants, the latter can be added directly or indirectly to the electrolyte. Direct addition includes addition of the surfactant to the electrolyte before they are introduced into a cell, or after the electrolyte has been introduced into a cell, or before the electrolyte has been introduced into a cell by first introducing the surfactant into the cell. Indirect addition includes incorporating the surfactant into the cathode as described in Example 2 and also includes impregnating the separator system of the cell with the surfactant.

This invention is further described by the following Examples.

EXAMPLE 1

Into a cell having a lithium anode and a fluorocarbon cathode comprising a fluorocarbon having the general formula $(CF_x)_n$ where $x$ has a value of 0.85 to 1 and $n$ is a very large number, there was introduced organic electrolyte comprising 1 molar lithium perchlorate dissolved in propylene carbonate in which there had been dissolved 0.9 percent by weight of iso-octyl phenoxy polyethoxy ethanol as the surfactant. This cell was discharged at a uniform current density of 1 ma/cm².

A cell which was identical to the aforedescribed cell except that it contained no surfactant was also discharged at the same current density of 1 ma/cm².

The data from the discharge of each of these cells is plotted in FIG. 1 with Curves A and B representing the performances of the cell with and without surfactant, respectively. As illustrated by FIG. 1, the cell with surfactant provided substantially improved discharge performance as compared with the cell without surfactant. Additionally, as is evident from the difference in the area under Curves A and B taken together with the similarity between the cells and the discharge current density, substantially higher weight energy densities are obtainable when a non-ionic, soluble surfactant is used.

EXAMPLE 2

A cell incorporating a surfactant was assembled as described in Example 1 using the same materials and amounts as described in Example 1 except that the surfactant was molded into the cathode as follows. The cathode was fabricated from a paste which was produced by wetting the fluorocarbon cathode material with a water/surfactant solution. The paste was then heated to drive off the water to leave a dry powder within which the surfactant was imbedded. When the electrolyte was added to the cell, it dissolved most of the surfactant in the cathode. Again, this cell and an identical cell without surfactant were discharged at a current density of 1 ma/cm².

The resulting data from the discharge of each cell is also plotted in FIG. 1 with Curves C and D representing the data from the cell with and without surfactant, respectively. Again, it can be seen that the cell with surfactant provides substantially improved discharge performance and weight energy density as compared with the cell without surfactant. The performance of the cell with surfactant in Example 1 differs from that of the cell with surfactant in this Example because not all of the surfactant in the cathode of the latter cell was dissolved by the electrolyte.

EXAMPLE 3

Into a cell having a lithium foil anode and a cathode comprising 85 percent by weight fluorocarbon having the formula $(CF_x)_n$ where $x = 1.35$ and $n$ is a very large number, 10 percent by weight graphite, and 5 percent by weight polytetrafluoroethylene compressed to an overall active material density of 1.7 gm/cm³, there was introduced nonyl phenyl polyethylene glycol ether dissolved in an electrolyte comprising 1 molar lithium perchlorate dissolved in an organic solvent mixture comprising 65 percent by weight propylene carbonate and 35 percent by weight ethylene carbonate. In one case (A), the amount of surfactant was 0.33 percent by weight of the weight of electrolyte. In another case (B), the amount of surfactant was 1 percent by weight of the weight of electrolyte. In a third case (C), an identical cell contained no surfactant for comparison purposes.

Figure 2:
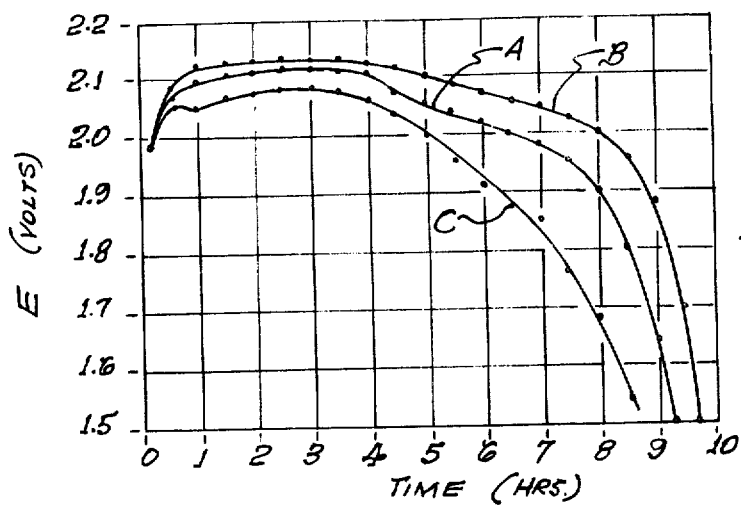
FIG. 2 is a plot of cell voltage vs. time and graphically represents the effect of varying the amount of surfactant introduced into the electrolyte of an organic electrolyte cell.

Each of the cells A, B and C was discharged at a constant current of 2 ma/cm², and the resulting data was plotted as shown in FIG. 2. As can be seen from FIG. 2, a substantial improvement is provided by 0.33 percent by wt. surfactant and a still greater improvement is provided by 1 percent by weight surfactant.

EXAMPLE 4

This Example illustrates the fact that the performance of an organic electrolyte cell having some surfactant dissolved in the electrolyte can approximate the performance of a similar cell without any surfactant, but having a significantly lower cathode density.

A cell was constructed having a lithium foil anode, a cathode comprising 85 percent by weight of a fluorocarbon [$(CF_x)_n$ where $x = 1.22$], 10 percent by weight graphite, and 5 percent by weight tetrafluoroethylene, and having an electrolyte comprising 1 molar lithium perchlorate in 30 percent by weight propylene carbonate, 40 percent (wt.) ethylene carbonate, and 30 percent (wt.) of 1,2-dimethoxyethane. The active material density of the cathode was 1.2 gm/cm³.

The foregoing cell was discharged at a current density of 1.7 ma/cm². The resulting data are plotted in FIG. 3 as Curve A. These data are to be compared with the data which was obtained from the cell described in Example 3 and which contained a surfactant and in which the cathode had a higher active material density of 1.7 gm/cm³. The data from the latter cell are plotted in FIG. 3 as Curves B (0.33 percent by weight surfactant) and C (1 percent by weight surfactant).

For comparison purposes, the cathode % utilization to 2 volts for each of the cells may be compared. When that is done, it will be seen that even though the cathode active material density for the cell of Curve C is substantially higher than that for the cell of Curve A, the former cell had performance characteristics approximating the latter cell because of the presence in the former of 1 percent surfactant. The foregoing comparison is meaningful even though the discharge current for the cell of Curve A was only 1.7 ma/cm² as compared to 2.0 ma/cm² for the cell of Curves B and C since the lower discharge rate would yield slightly better utilization and even though the values of $x$ in the fluorocarbon formula are slightly different since this difference would also favor the performance of the cell of Curve A. Additionally, the performance of the latter cell is fairly typical for cells of that electrode structure without added surfactant so that the slight difference in electrolyte itself (apart from the surfactant) is not meaningful.

Figure 3:
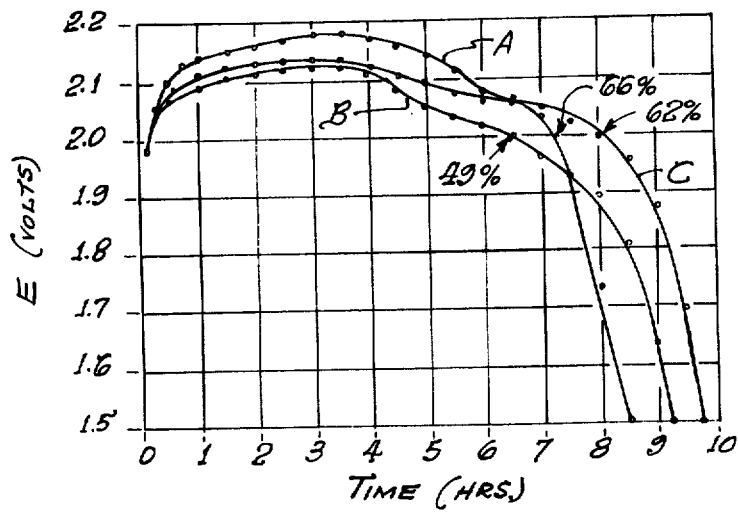
FIG. 3 is also a plot of cell voltage vs. time and graphically represents the effect of adding a non-ionic surfactant to an electrolyte of an organic electrolyte cell in relation to the cathode densities.

A further useful comparison can be made by comparing the curves of FIG. 3 with Curve C of FIG. 2. The latter curve represents a high cathode active material density (1.7 gm/cm³), surfactant-free cell having 37 percent utilization to 2 volts. As will be noted from this comparison, the cell represented by Curve C of FIG. 2 has a significantly lower % utilization than does the cell represented by Curves B and C of FIG. 4 (same cathode active material density, but with surfactant) or cell represented by Curve A of FIG. 4 (lower cathode active material density and no surfactant).

I claim:

1. An improved current-producing, organic electrolyte cell which comprises an operable combination of an anode, a cathode, and an organic electrolyte substantially free of water and in which the improvement comprises a non-ionic surfactant which is soluble in said organic electrolyte and which is present in said cell in an amount of at least about 0.01 percent by weight of the weight of said organic electrolyte.

2. The cell of claim 1 wherein said non-ionic surfactant is present in said organic electrolyte.

3. The cell of claim 1 wherein said non-ionic surfactant is initially present in said cathode and wherein it is dissolved from said cathode by said electrolyte.

4. The cell of claim 1 wherein said non-ionic surfactant is present in said cell in an amount between about 0.01 and about 10 percent by weight of the weight of said organic electrolyte.

5. The cell of claim 1 wherein said non-ionic surfactant is present in an amount between about 0.01 and about 2 percent by weight of the weight of said organic electrolyte.

6. The cell of claim 1 wherein said non-ionic surfactant is selected from the group consisting of alkyl aryl polyethers, alkyl aryl polyethylene glycol ethers, and alkyl aryl polyether alcohols.

7. The cell of claim 6 wherein said non-ionic surfactant is one of nonyl phenoxy polyoxyethylene, nonyl phenyl polyethylene glycol ether, dodecylphenyl polyethylene glycol ether, iso-octyl phenoxy polyexthoxy ethanol and nonylphenoxy polyethoxy ethanol.

8. An improved current-producing, organic electrolyte cell which comprises an operable combination of (a) an anode of a metal which is less noble than zinc, (b) a cathode comprised of a carbonaceous material, and (c) an organic electrolyte substantially free of water, said improvement comprising:
   a non-ionic surfactant which is soluble in said organic electrolyte and which is operably present in said cell in an amount of at least about 0.01 percent by weight of the weight of said organic electrolyte.

9. The cell of claim 8 wherein said anode metal is one of sodium and lithium, and said cathode material is a material having the general formula $(CF_x)_n$ where $x$ is a positive number up to 2 and $n$ is an indefinite, large number.

10. The cell of claim 9 wherein said non-ionic surfactant is present in said organic electrolyte in an amount between about 0.01 and about 10 percent by weight of the weight of said organic electrolyte.

11. The cell of claim 9 wherein said non-ionic surfactant is present in an amount between about 0.01 and about 2 percent by weight of the weight of said organic electrolyte.

12. The cell of claim 9 wherein said non-ionic surfactant is selected from the group consisting of alkyl aryl polyethers, alkyl aryl polyethylene glycol ethers, and alkyl aryl polyether alcohols.

13. The cell of claim 12 wherein said non-ionic surfactant is one of nonyl phenoxy polyoxyethylene, nonyl phenyl polyethylene glycol ether, dodecylphenyl poly ethylene glycol ether, iso-octyl phenoxy polyethoxy ethanol, and nonylphenoxy polyethoxy ethanol.

14. A method for improving the performance of a current-producing, organic electrolyte cell having, in operable combination, an anode, a cathode, and an organic electrolyte substantially free of water, said method comprising adding a non-ionic surfactant to said organic electrolyte, said non-ionic surfactant being soluble in said organic electrolyte and being present in an amount of at least about 0.01 percent by weight of the weight of said organic electrolyte.

15. The method of claim 14 in which said non-ionic surfactant is added in an amount between about 0.01 percent and about 10 percent by weight of the weight of said organic electrolyte.